(No Model.) O. B. JENNINGS. 3 Sheets—Sheet 1.
MANUFACTURE OF SUGAR FROM SUGAR CANE, SORGHUM, MAIZE, AND OTHER PLANTS.
No. 287,544. Patented Oct. 30, 1883.
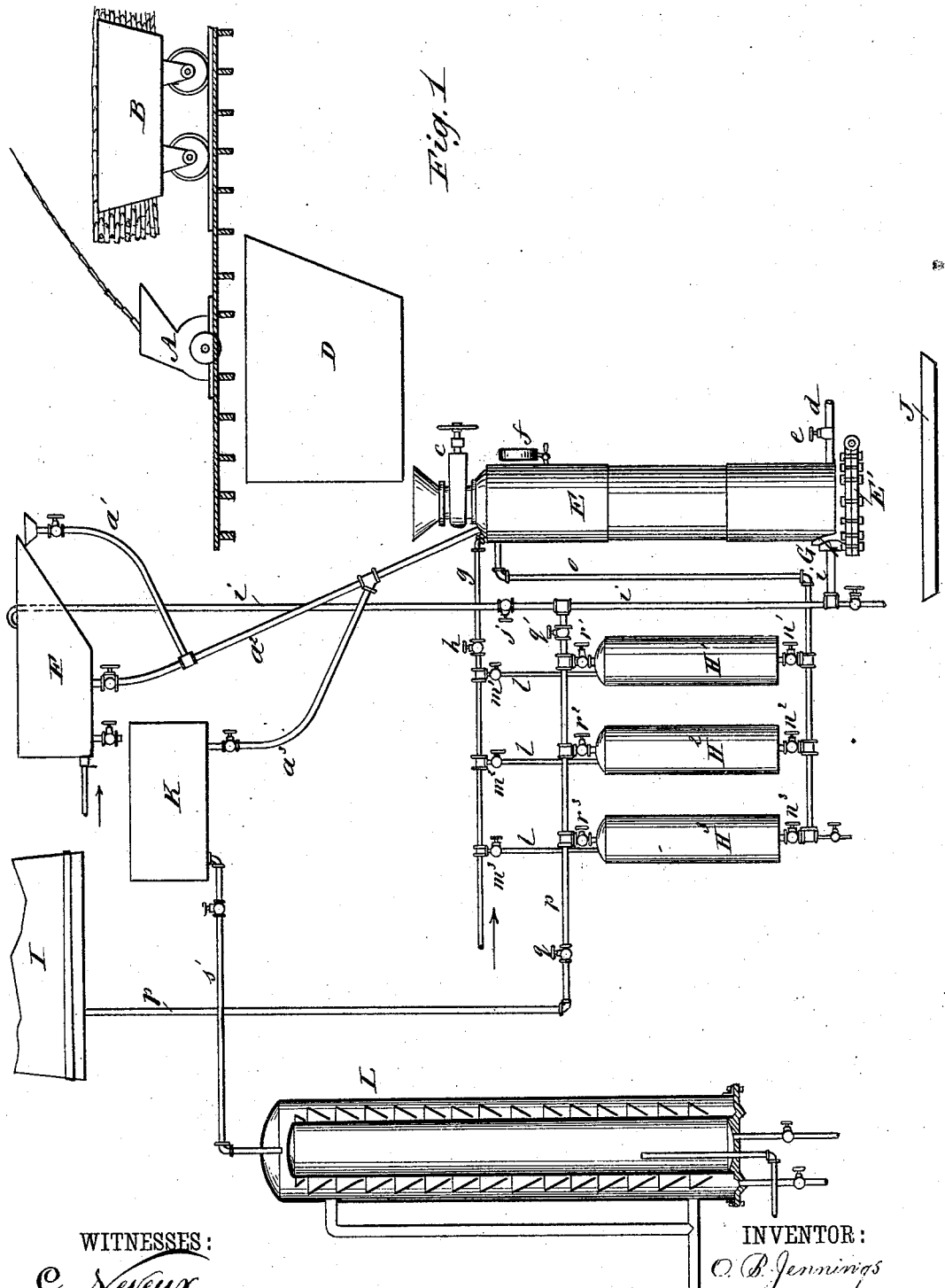
WITNESSES:
C. Neveux
L. Sedgwick
INVENTOR:
O. B. Jennings
BY Munn & Co
ATTORNEYS.

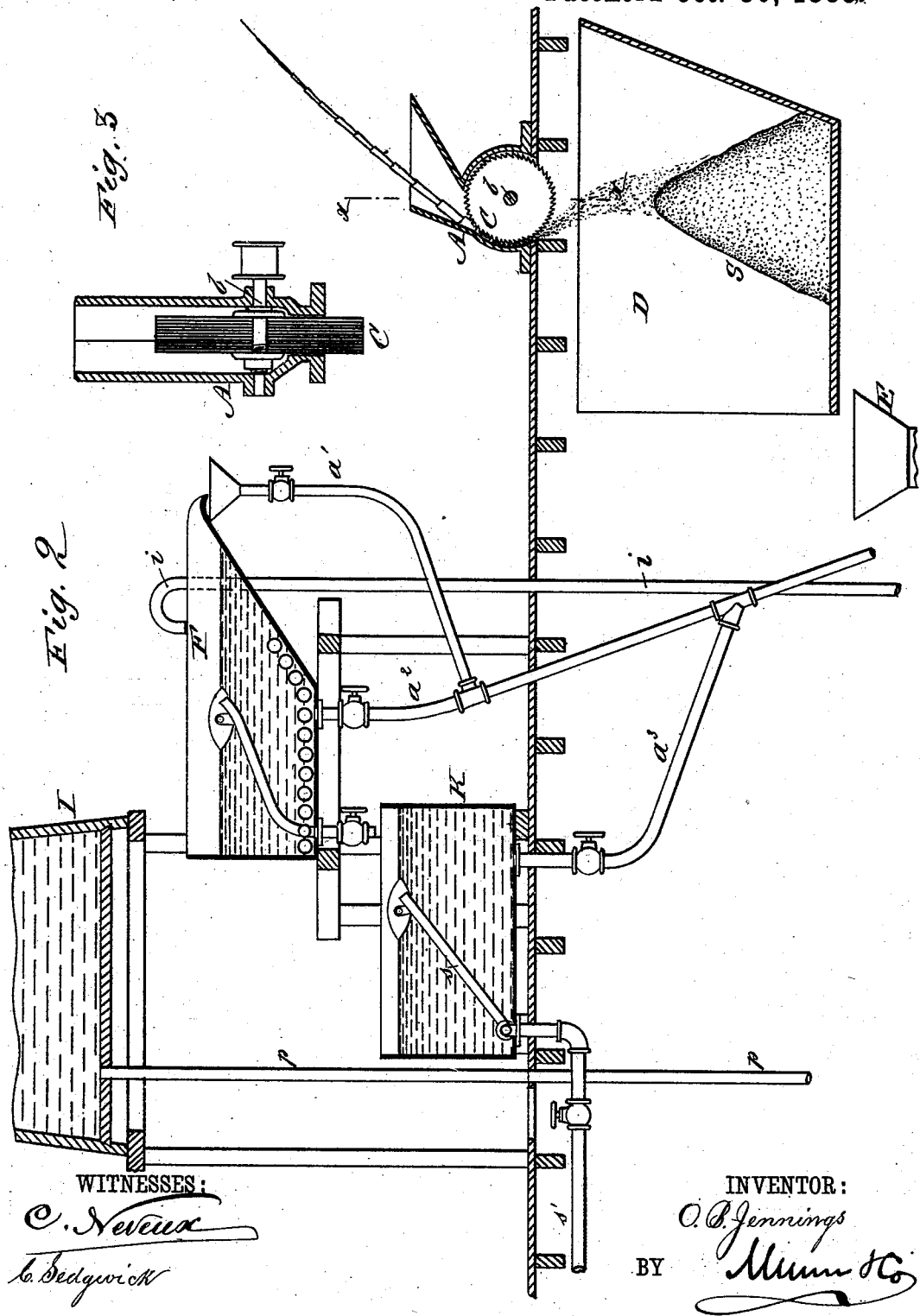

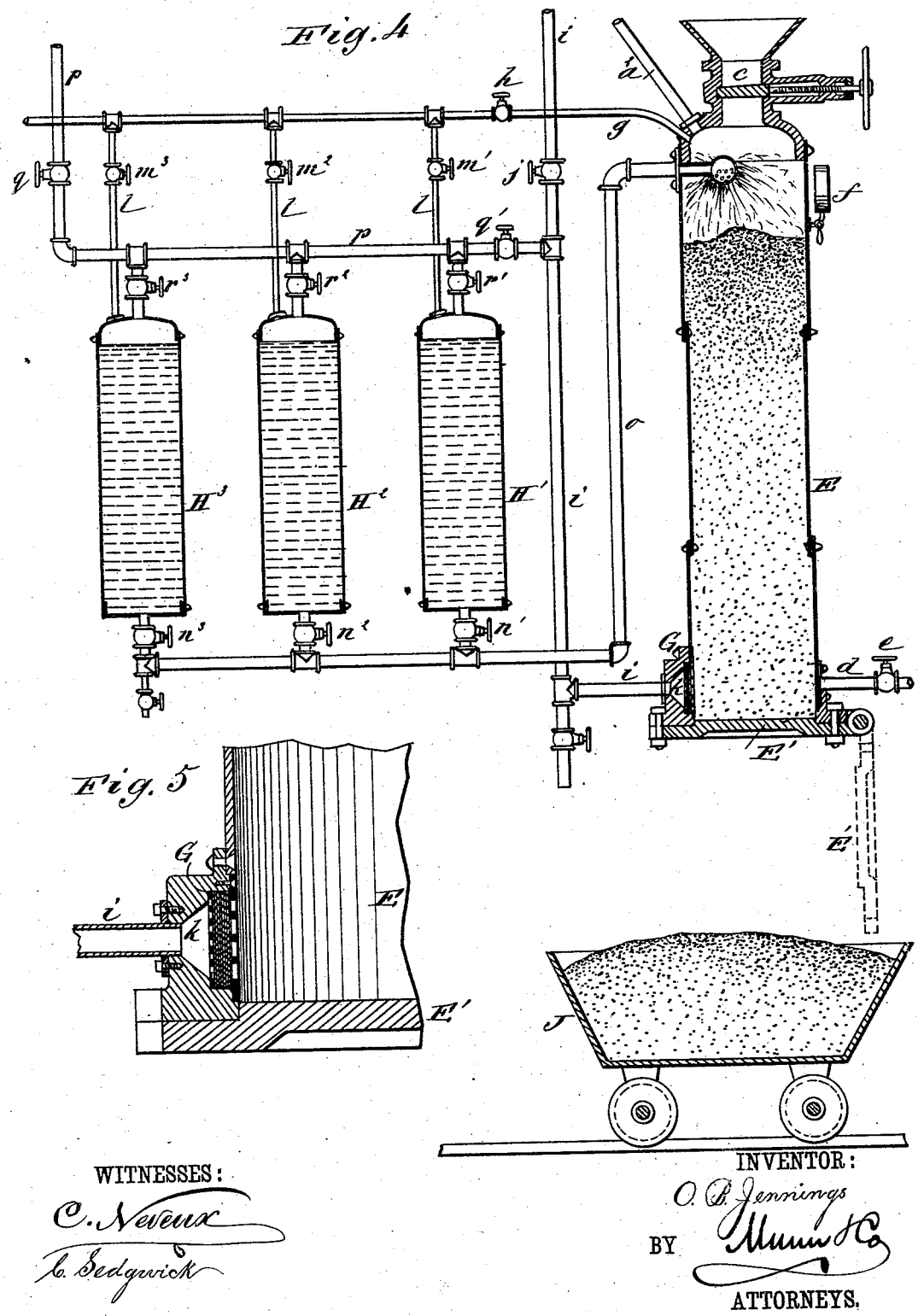

ORLANDO B. JENNINGS, OF HONEY CREEK, WISCONSIN.

MANUFACTURE OF SUGAR FROM SUGAR-CANE, SORGHUM, MAIZE, AND OTHER PLANTS.

SPECIFICATION forming part of Letters Patent No. 287,544, dated October 30, 1883.

Application filed April 2, 1883. (No model.)

*To all whom it may concern:*

Be it known that I, ORLANDO B. JENNINGS, of Honey Creek, in the county of Walworth and State of Wisconsin, have invented certain new and useful Improvements in the Manufacture of Sugar from Sugar-Cane, Sorghum, Maize, and other Plants, of which the following is a full, clear, and exact description.

This invention relates to the manufacture of sugar from different sugar-producing plants, including sugar-cane, maple, sorghum, and maize; but it has more especial reference to defecating the juice in the stalks of sugar-cane, sorghum, and maize and extracting the juice from the residue or bagasse for subsequent boiling into sugar and sirup.

In making sugar from sugar-producing plants with my invention, it is my purpose to extract and utilize all of the saccharine juice and to obtain entire control of its defecation, so as to make a sirup free from foreign matter and elements of fermentation. By it the juice in evaporating is free from skimmings or precipitates, that are always liberated in the ordinary method of extracting, which waste my invention avoids.

Applied to the manufacture of sugar from cane and other stalks, the invention consists in a process of preparing said stalks for the more perfect extraction of the juice by reducing the same to a finely-comminuted or dust-like condition, and whereby the juice-cells are thoroughly crushed and ruptured. This part of the invention also includes a combination of circular saws, forming a compound saw, for reducing the canes or stalks to such finely-comminuted condition, likewise sprinkling or mixing with said dust, before defecation, dry lime or lime-whitewash in powder. Such lime combines with the acid in the dust, and upon a suitable application of heat to the whole forms double precipitates at one and the same time.

Furthermore, the invention consists in a process of precipitating the matter in the cane-juice cells and cane-pulp, or in the juice of any sugar-producing plant, however obtained, by exposing the juice or material under treatment to a temperature of over 212° Fahrenheit, and subsequently removing the juice from the woody or precipitated matter by washing the same with currents of water. In carrying out this part of the invention I use a cylinder or other suitable vessel in which the temperature is raised to any required degree (about 212° Fahrenheit) for defecation and precipitation of the matter capable of being precipitated, whether the same be contained in sugar-cane, sorghum, and maize stalks, reduced to dust or not, or in any saccharine juice, including maple-sap, the temperature varying from 228° to 267° Fahrenheit, according to the ripeness of the material under treatment and other conditions. This vessel is suitably constructed or provided with means to admit of the introduction of the material to be treated; also, to provide for the forcing out of the exhausted bagasse or refuse, and for the introduction of steam while and after charging it; likewise, steam to act upon the condensed water and released juice and force them out through a filter. Means are also provided for running the wash-water from a series of tanks in succession through said vessel, to act upon the charge therein, and an arrangement of defecating-tank connections for introducing scum, sediment, and sweet wash-water upon a succeeding charge.

Reference is to be had to the accompanying drawings, forming part of this specification, in which similar letters of reference indicate corresponding parts in all the figures.

Figure 1 represents a side elevation of a complete apparatus adapted to carry out and embodying my invention, with an attached evaporator in section. Fig. 2 is a sectional side view, upon a larger scale, of the upper part of said apparatus. Fig. 3 is a sectional view, upon a still larger scale, on the line *x x* in Fig. 2, of a hopper and series of saws used in said apparatus; Fig. 4, a second side view of the lower portion of the apparatus; and Fig. 5, a sectional elevation, upon a larger scale, of the lower portion of the diffusing-tank of the apparatus, in part with attached filter.

To treat sugar-cane, sorghum, or maize-stalks, I take the cane, for instance, and feed it into a suitably-shaped hopper, A, to which it may be transferred by truck B, or otherwise. (See Figs. 1, 2, and 3 of the drawings.) In and through the bottom open portion of this hopper is a rapidly-revolving circular saw, C, or rather a series of such saws, with which the cane comes in contact, for the purpose of reducing it into as fine a comminuted condition as possible, or virtually forming the cane into fine sawdust, as distinguished from merely slicing it. These circular saws practically constitute but a single saw of, say, from twelve to twenty inches in diameter, more or less, and may be made up of a series of circular saws placed close together upon one and the same mandrel, $b$, and aggregating a peripheral width of from one and one-half to two inches, more or less, so as to cut as wide as one or more diameters of the butts of the largest cane. This compound saw should be revolved at as high a speed as can be done with safety. The cane should be introduced by hand or otherwise to said saw vertically, or nearly so, as shown in Figs. 1 and 2, and is reduced to sawdust as it passes down between the cutting-edges of the said saw and the closely-fitting front side of the lower open portion of the hopper A, the cane being cut away as fast as gravity will bring it down to the saw. The object sought by thus cutting the cane into fine dust is that the heat and wash-water in the diffuser, as hereinafter described, will sooner reach the center of each particle of the cane, and by the action of the heat form in and around the same the precipitate that is due from the juice that it contains. By the rapid motion of the teeth of the saw I mechanically crush and rupture as much as possible the juice-cells, so as to give free access for the heat and wash-water to every atom. The finely-comminuted cane or cane-dust S is delivered from the saw C and hopper A into a receiver, D, from whence it is passed, in proper charges, into an upright diffusing-tank, E, upon opening an upper valve, $c$, for the purpose. Steam is introduced from below by a pipe, $d$, on opening a valve, $e$, to permeate the mass from its bottom upward as the diffuser is being filled, so as to heat the cane-dust as fast as the diffuser is filled. Lime may or may not be mixed with the said dust. After the diffuser has been properly charged and the charge, while filling, heated by steam, as described, the valve $c$ is closed and steam is continued to be supplied by the pipe $d$ until the mass is thoroughly heated by exposing it to a temperature of over 212° Fahrenheit. The diffuser should be provided with a steam-gage, $f$, to indicate the pressure used on each charge to be defecated. A note should be made of the number of the charge, its weight, the amount of lime used, and the pressure at which the defecation was effected. The lowest pressure at which a good defecation can be obtained is preferred. Sorghum-juice, when the seed is in the milk, will not admit of as high a temperature as riper cane. The valve $e$ is then closed and steam of, say, seventy-five pounds pressure (more or less) is introduced by a pipe, $g$, having a valve, $h$, onto the top of the mass in the diffuser E, and communication is opened by a pipe, $i$, on turning a cock, $j$, between the bottom of the diffuser and an upper defecating-tank, F, to force the condensed water and juice in the diffuser through a filter, G, into said defecating-tank or any number of such tanks. So soon, however, as steam blows through the pipe $i$, the pipes $g$ and $i$ are closed.

The filter G is made of several thicknesses of coarse cloth—such as coffee-sacking—stitched and cut in a circular form and placed in a recess or nipple, $k$, over the mouth of the pipe $i$. As the precipitate is made from the juice before it is compressed from the cells, and by the lime after there is no accumulation of solid matter to obstruct the action of the filter G, consequently a small filter-surface is sufficient. The juice of the cane-dust, heated in the diffuser E to the proper temperature and subjected to the action of the lime, will, if properly neutralized, give no precipitate or scum when the juice is afterward boiled in an open pan at a lower temperature. After all of the condensed water and juice has been forced by steam, as described, from the diffuser E into the defecating-tank F, then steam is introduced by a pipe, $l$, having a cock, $m'$, into a wash-water tank, H', and from thence, on opening a cock, $n'$, said wash-water is forced by a pipe, $o$, to the top of the diffuser until the weight of the water and juice in the tank F is equal to the weight of the cane used for a charge in the diffuser E. Such wash-water, which may be supplied from a water-tank, I, by a pipe, $p$, provided with cocks $q\ q'$, and which also connects with the pipe $i$, takes the place of sweet juice. A displacement for the cane or bagasse will weigh about as much as the cane before it entered the diffuser E. The charge of juice in the tank F is now to be defecated and boiled to a sirup. To make the wash-water in the tank H' run into the tank F, the valves $m'$ and $n'$ are opened, as described, and said water, forced by the pressure of the steam through the pipe $o$, passes down through the diffuser E and filter G into and up the pipe $i$ to the tank F. The pipe $o$ terminates in a rose-sprinkler within the upper part of the diffuser. The cane-dust in the diffuser E may be further washed by opening cocks $m^2$ and $n^2$ and closing the valve $j$ in the pipe $i$. This will allow the water in a second wash-water tank, H², to run through the pipe $o$, down through the diffuser E and filter G and up through the pipe $i$ and cock $r'$ into the first wash-water tank, H', to be used in washing a succeeding charge of cane-dust. This operation may be repeated or extended by using a third wash-water tank, H³, and similarly-operating valves or cocks $m^3\ n^3$, to cause the water to run from the tank H³ into the tank H², the tank H³ being filled with water from the tank I above.

To provide for the operation of the wash-water tanks H' H² H³, as described, they are respectively connected, not only with the steam-pipe g by pipes l, having cocks m' m² m³, but also with the water-supply pipe p, subject to separate control by cocks r' r² r³. Any number of wash-water tanks may thus be used.

The bottom of the diffuser E is fitted with a door, E', which may be let down or opened, as shown by dotted lines in Fig. 4, to discharge the bagasse from the diffuser E, under pressure of steam from above, into a car, J, beneath the diffuser. The precipitates, skimmings, and washings holding saccharine matter and contained within the defecating-tank F, and, if used, also within a defecating juice-tank, K, are run upon the surface of any succeeding charge of cane-dust in the diffuser E by means of pipes a' a² a³, provided with suitable valves, and are treated as fresh cane. This saves all loss and waste from skimmings, &c. If the use of lime with the cane-dust in the diffuser E has been wholly omitted, or if less lime be used than is sufficient to neutralize the acid produced by the heat and in the lime-defecated juice, lime can be added to the juice in the defecating-tank F. The juice in said tank F should then be heated so as to boil, which may be done by means of steam-coils, after which it should be thoroughly skimmed, and then boiled for about ten minutes, more or less, which shortens the time required for settling. It is then allowed to settle by shutting off steam entirely in the coil within the defecating-tank. It is important for success to have perfect defecation and thorough settling of all sediment at this stage of the work in the defecating-tank F. The thoroughly-defecated juice is then drawn from its surface in the tank F into the defecated-juice or settling tank K, if necessary for further subsidence, and where it may be subjected to the action of sulphurous acid as a solution; but this is optional. If the solution is used with the juice when the temperature is above 150° Fahrenheit, the gas is volatilized, which is a wasteful way to use it. It consequently, if used, should be admitted to the juice at a lower temperature. From the tank K, if used, the the defecated sulphurous-acid juice is drawn by a swing-pipe, s, and pipe s' in connection therewith from the surface in the tank K and delivered into or on the top of an evaporator, L, or any other suitable evaporator. This evaporator L, which I make the subject of a separate application for Letters Patent, consists, generally, of an upright steam-tight pipe or cylinder, to the inside of which steam is admitted, and which is provided with means for draining off water of condensation. Around the exterior of this cylinder are arranged a series of frustums of cones having their smaller ends downward, and which have contracted openings at their bottoms, the same forming cups from which the distributed juice runs in a thin film. Outside of or around this cylinder, with its frustrums of cones, is another close cylinder provided with a pipe which leads to a vacuum-pump or a blast-draft, when it is required to evaporate *in vacuo*, and with a lower pipe for drawing off the sirup.

When making sugar from maple-sap, said sap, which holds in solution substances that become solids by the action of heat upon the evaporation of the water it contains, is to be treated in the same manner as the cane-dust by heating it in the diffuser E, to precipitate the solid matter that will be formed at the temperature or pressure of the steam, as hereinbefore described, used in the diffuser, after which the sap is forced through the filter F or allowed to settle and then decanted and boiled to sirup.

In making sugar from cane in accordance with my description, it will be observed that in sawing up the cane into dust I crush and rupture in a most perfect or thorough manner the juice-cells, so as to expose every particle to the heat and wash-water, and that my process, as described, essentially differs from another process which has been proposed, of cutting the stalks into slices and subjecting the same to the action of steam without mechanical disruption of the cells, and exposing the mass of slices to a pressure of steam to coagulate the albumen and its associate impurities for the purpose of rendering them insoluble, such at least being the object sought to be obtained by said other process. I most positively discard, in fact, any process or practice in which the juice is expelled by steam-pressure without mechanical disruption of the cells, or any such temperature or pressure of steam as will coagulate the albumen of the juice and allow the juice to run out cold and in a pure condition, and equally discard any attempt of employing mechanical means for washing out remaining juice in partially-exhausted cane-chips.

Having thus described my invention, I claim as new and desire to secure by Letters Patent—

1. In the process of treating cane for the extraction of the saccharine matter, the passing of the cane against the peripheral surface of a series of rapidly-revolving and closely-arranged saws, to effect the reduction of the same to a dust-like condition, as and for the purpose set forth.

2. In the process of extracting the saccharine matter of cane, the mixing with the comminuted cane, before the passage of the same into the diffusing apparatus and the defecating of the same, of dry lime or lime-whitewash, whereby the material will be thoroughly defecated without the liability of the admixture therewith of the precipitate of the lime, substantially as described.

3. In the manufacture of sugar from sugar-cane, sorghum, or maize stalks cut or otherwise reduced to expose the juice-cells, and from the juices of other sugar-producing plants containing matter capable of being precipitated at a temperature of over 212° Fahrenheit, the process herein described of treating said sugar-producing materials or saccharine juices, by first subjecting them to a temperature of over 212° Fahrenheit, and afterward removing the juice from the woody or precipitated matter by means of currents of wash-water, essentially as specified.

4. The combination, with the diffusing-tank E, of the upper and lower steam-pipes, $g$ $d$, the wash-water pipe $o$, and the juice-pipe $i$, essentially as and for the purposes herein set forth.

5. The combination, with the diffusing-tank E, its upper and lower steam-pipes, $g$ $d$, and wash-water pipe $o$, of the supply water-pipe $p$ and the series of wash-water tanks H' H$^2$ H$^3$, with their pipes $l$ and cocks or valves $m'$ $m^2$ $m^3$, $r'$ $r^2$ $r^3$, and $n'$ $n^2$ $n^3$, for operation substantially as described.

6. The combination, with the diffusing-tank E, of one or more defecating-tanks to which the juice is delivered from the diffusing-tank, and pipes provided with valves for drawing the skimmings, settlings, and sweet water from said defecating tank or tanks and passing the same into the diffusing tank or vessel, essentially as and for the purposes herein set forth.

7. In combination with the defecating-tank F, diffusing-tank E, and a suitable evaporator, the settling-tank K, provided with a discharge-pipe for running the juice into the evaporator, and with means for passing its sediment into the diffusing-tank, substantially as described.

O. B. JENNINGS.

Witnesses:
A. GREGORY,
C. SEDGWICK.